Feb. 9, 1926.

C. H. HUGHES

ROLLER BEARING

Filed May 16, 1924

1,572,606

Inventor
Charles H. Hughes
By his Attorney
Fred O Fischer

Patented Feb. 9, 1926.

1,572,606

UNITED STATES PATENT OFFICE.

CHARLES H. HUGHES, OF EAST ORANGE, NEW JERSEY.

ROLLER BEARING.

Application filed May 16, 1924. Serial No. 713,649.

*To all whom it may concern:*

Be it known that I, CHARLES H. HUGHES, a citizen of the United States, and a resident of the city of East Orange, in the county of Essex and State of New Jersey, have invented certain new and useful Improvements in Roller Bearings, of which the following is a full, clear, and exact description.

The present invention relates to improvements in roller bearings, and it is the principal object of the invention to provide a bearing positively eliminating all end thrust and cutting of the cage rings or elements.

Another object of the invention is the provision of a roller bearing in which the liability of the discs or rings between which the rollers run becoming rough or recessed, thus interfering with the free travel of the rolling elements, is prevented.

A further object of the invention is the provision of a roller bearing forming a unitary structure of simple and economical construction, the rollers of which are made from a round blank.

A still further object of the invention is the provision of a roller bearing, the hollow rollers of which are open at one end and have a semi-spherical or curved face at their opposite closed end.

It is furthermore also one of the objects of the present invention to provide a roller bearing in which the rollers are arranged in their cage in such manner that their outer ends are kept spaced apart from the inner faces of the cage rings, while their inner meeting ends are semi-spherical or curved on their outer faces.

It is also an object of the present invention to provide a roller bearing which is very strong, durable and inexpensive.

These and other objects of my invention and advantages thereof will become more fully apparent as the description proceeds, and will then be specifically pointed out in the appended claims.

In the accompanying drawing forming a material part of this disclosure:

Figure 1:
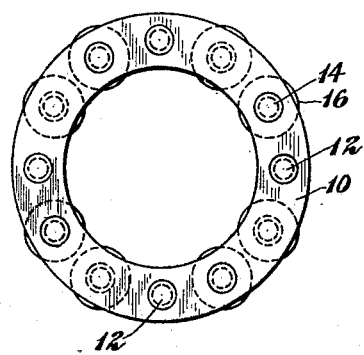
Figure 1 is an end elevation of a roller bearing constructed according to the present invention.
Figure 2:
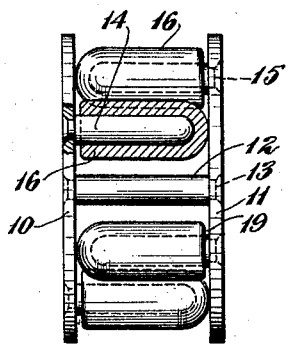
Figure 2 is a front elevation of the bearing with one of the rollers shown in section.

The roller bearing comprises a cage which consists of two non-perforated side rings or discs 10 and 11 of suitable material and size which are connected by a plurality of suitably spaced rods 12, the outer ends of which are secured or anchored in the rings 10 and 11 in any well known manner as indicated at 13. Between each pair of rods 12, in the space left therebetween, a pair of oppositely directed studs 14 and 15 respectively are secured with their outer ends in one of the cage rings, for instance the stud 14 is secured in ring 10 while stud 15 is secured in ring 11 or vice versa.

Figure 5:
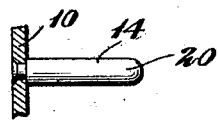
Figure 5 is a detail front view of one of the roller studs illustrating its anchorage within one of the cage rings which is shown in section.
Figure 6:
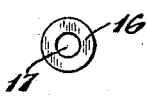
Figure 6 is an end elevation of one of the hollow rollers.
Figure 7:
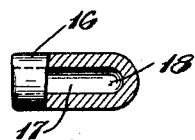
Figure 7 is a detail front elevation of one of the rollers, partly in section to illustrate its interior construction.

The studs carry hollow roller elements 16 drawn from a round metal blank, and each provided with a central bore 17 adapted to receive the stud 15. The length of each stud 15 and of the axial bore 17 of each roller are so selected, that the engagement of the free end of the stud with the rounded end 18 of the axial bore 17 of the roller limits the inward movement of the roller on the stud to such an extent that the outer flat bottom face of the roller is kept apart or spaced from the inner face of its respective cage ring as indicated at 19, while the semi-spherically curved outer end or mantle of the roller snugly fits against or engages the inner face of the opposite cage ring. The inner ends of the studs 15 are suitably rounded and curved in conformity with the curvature of the end 18 of the roller bore to allow a rotation of the roller around the stud with the least possible friction; this curvature is clearly shown at 20, Figure 5.

Figure 3:
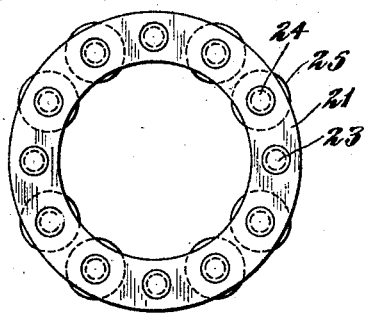
Figure 3 is an end elevation of a modified form of roller bearing.
Figure 4:
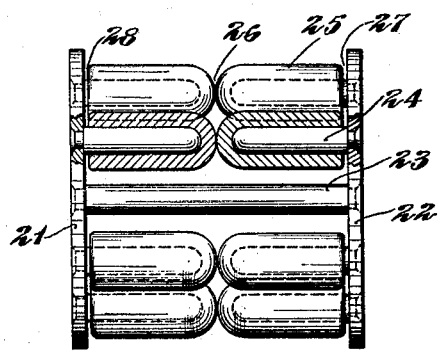
Figure 4 is a front elevation of the bearing, Figure 3, two of the oppositely disposed rollers being shown in section.

In the modified form of roller bearing illustrated in Figures 3 and 4, the cage rings or discs 21 and 22 are kept in spaced relation and connected to form the cage by means of a suitable number of bars 23 having their outer ends anchored in the cage rings. A plurality of studs 24 are secured with their outer ends in the rings 21 and 22 while their inner ends are oppositely disposed as shown in Figure 4. The rollers used with this form of construction and the studs are otherwise constructed as described above, and it will be clear that when the parts are assembled, the rounded outer mantle ends of each pair of rollers 25 on two oppositely disposed studs 24 will meet and engage in approximately the middle of the cage as indicated at 26, while the inner ends will be kept apart or spaced from the inner faces of the rings 21 and 22 as indicated at 27 and 28 respectively.

The operation of the device will be entirely clear from the above description, and it will be readily understood, that the bearing may be manufactured in standard sizes and may be mounted in its place of use without the aid of any special assembling means.

It will also be clear that instead of arranging the rollers pairwise between each two of the connecting cage rods as illustrated, any number of rollers may be so used, the main and chief object of the invention being to keep the ends of the rollers spaced apart from the cage rings so that either no contact is made between these parts or the contact with one of the rings is made with a rounded or semi-spherical highly polished mantle end tending to burnish, but not to cut or otherwise gouging the rings.

Changes may be made in the general arrangement and in the construction of the minor details of my invention without departing from the scope and spirit of the same as laid down in the appended claims.

Having thus described my invention what I claim as new and desire to protect by Letters Patent is:

1. A roller bearing comprising a cage, a plurality of studs in said cage alternatingly disposed to point in opposite directions, each having a semi-spherical free end, and a hollow roller on each stud having an axial bore of a depth less than the length of the stud for keeping the flat outer end of each roller spaced from the walls of said cage to prevent gouging.

2. A roller bearing comprising a cage, a plurality of oppositely disposed studs secured with one end in the end walls of said cage and having their outer ends semispherically curved, a hollow roller on each stud having an axial bore of a depth less than the length of the stud, said bore ending in a semi-spherical part adapted to be engaged by the correspondingly curved end of the stud, and means for securing the studs in the end walls of said cage.

3. In a roller bearing an inner and an outer ring, and a plurality of pairwise arranged rollers interposed between said rings, the rollers of each pair pointing in opposite directions and the alternate ends of said rollers spaced apart from said rings.

4. In a roller bearing an inner and an outer end ring, means for connecting said rings in spaced relation to form a cage, a plurality of studs alternatingly arranged on said rings to point in opposite directions, means for securing the outer ends of said studs in the walls of said rings, a hollow roller on each stud having an axial bore of a length less than the length of the stud to keep one end of said roller spaced from the inner faces of said rings, and a semi-spherically curved outer end on each roller engaging the inner face of the opposite ring.

5. In a roller bearing two end rings connected in spaced relation to form a cage, pairwise arranged studs secured at one end in said rings, and having their oppositely disposed rounded outer ends extending into said cage, a hollow roller on each of said studs having an axial bore of a depth less than the length of the stud for keeping the outer flat ends of said roller spaced apart from the inner faces of said rings, an outer semi-spherical head on each roller adapted to engage the head of the roller on the opposite stud, and means for anchoring said studs in said rings.

This specification signed and witnessed this 12th day of May, 1924.

CHARLES H. HUGHES.